(12) United States Patent
Morse

(10) Patent No.: US 11,340,067 B2
(45) Date of Patent: May 24, 2022

(54) PANEL INSTALLATION ASSIST DEVICE

(71) Applicant: Steve Morse, Grove City, OH (US)

(72) Inventor: Steve Morse, Grove City, OH (US)

(*) Notice: Subject to any disclaimer, the term of this patent is extended or adjusted under 35 U.S.C. 154(b) by 0 days.

(21) Appl. No.: 16/997,428

(22) Filed: Aug. 19, 2020

(65) Prior Publication Data
US 2022/0057204 A1 Feb. 24, 2022

(51) Int. Cl.
G01C 9/26 (2006.01)
E04F 21/04 (2006.01)

(52) U.S. Cl.
CPC .............. G01C 9/26 (2013.01); E04F 21/04 (2013.01)

(58) Field of Classification Search
CPC .................... G01C 9/26; E04F 21/04
USPC ........................................... 33/379
See application file for complete search history.

(56) References Cited

U.S. PATENT DOCUMENTS

| 5,655,337 | A | 8/1997 | Bryant | |
| 5,658,113 | A * | 8/1997 | Lazo | E04F 21/185 414/11 |
| 6,286,285 | B1 | 9/2001 | Martell | |
| 6,367,227 | B1 * | 4/2002 | Veyna | E04F 19/00 33/410 |
| 6,549,816 | B2 | 4/2003 | Gauthier | |
| 7,111,435 | B2 * | 9/2006 | Flores | E04F 21/04 33/526 |
| D573,908 | S | 7/2008 | Levinson | |
| 7,421,829 | B2 * | 9/2008 | Gwynn | E04F 21/18 52/749.1 |
| 7,694,464 | B2 | 4/2010 | Garcia | |
| 7,802,372 | B1 * | 9/2010 | Silberberg | G01C 15/008 33/451 |
| 7,946,045 | B2 * | 5/2011 | Allemand | G01C 9/32 33/379 |
| 9,194,138 | B2 | 11/2015 | Gower | |
| 2005/0257492 | A1 | 11/2005 | Miller | |
| 2013/0318804 | A1 * | 12/2013 | Harris | G01C 9/26 33/342 |
| 2013/0326895 | A1 * | 12/2013 | Bureau | G01C 9/26 33/381 |

FOREIGN PATENT DOCUMENTS

WO WO2014011961 1/2014

* cited by examiner

Primary Examiner — Yaritza Guadalupe-McCall

(57) ABSTRACT

A panel installation assist device for supporting one end of a panel during installation includes a bar, which has a set of holes extending therethrough from a first face thereof. Respective holes are selectively alignable with studs or rafters. Mounting hardware inserted through the holes mounts the bar to the studs or the rafters. The bar has a set of orifices positioned therethrough, each of which has a spirit bubble tube positioned therein, which is engaged to the bar. Respective spirit bubble tubes indicate an orientation of a longitudinal axis of the bar relative to horizontal and vertical. A notch extends into the bar from a first edge thereof and the first face, and between opposed ends of the bar. The notch is configured for insertion of an edge of a panel so that one end of the panel is supported by the bar to facilitate installation of the panel.

6 Claims, 3 Drawing Sheets

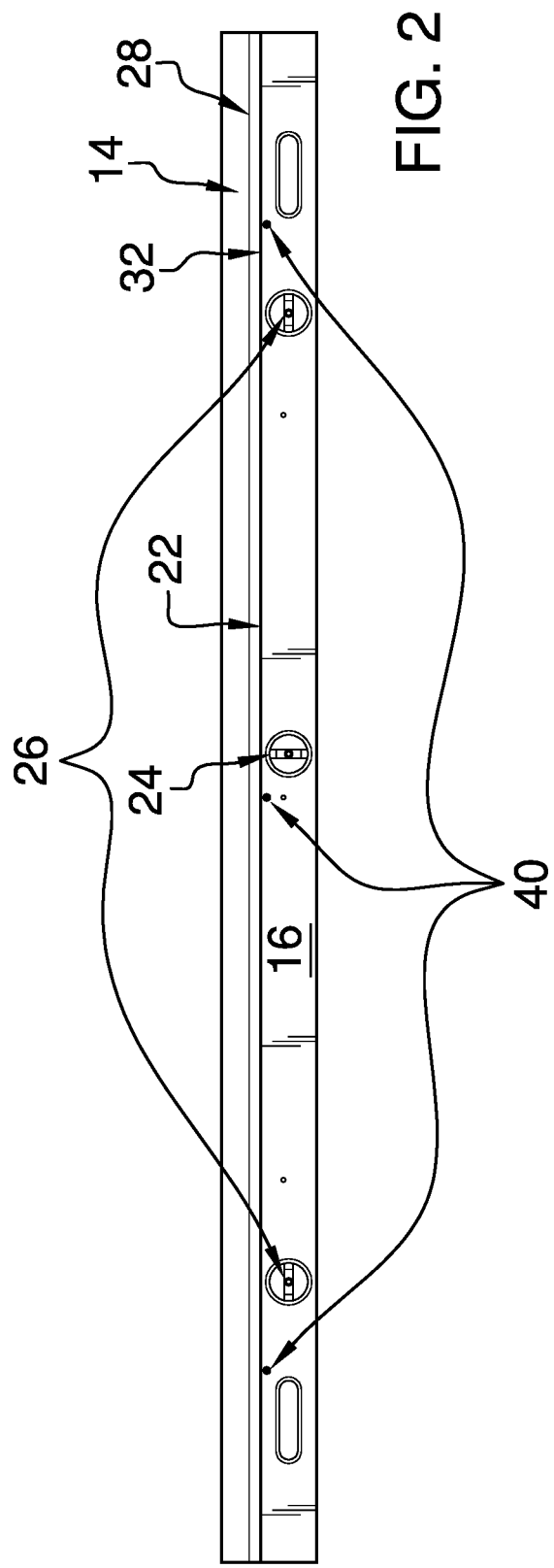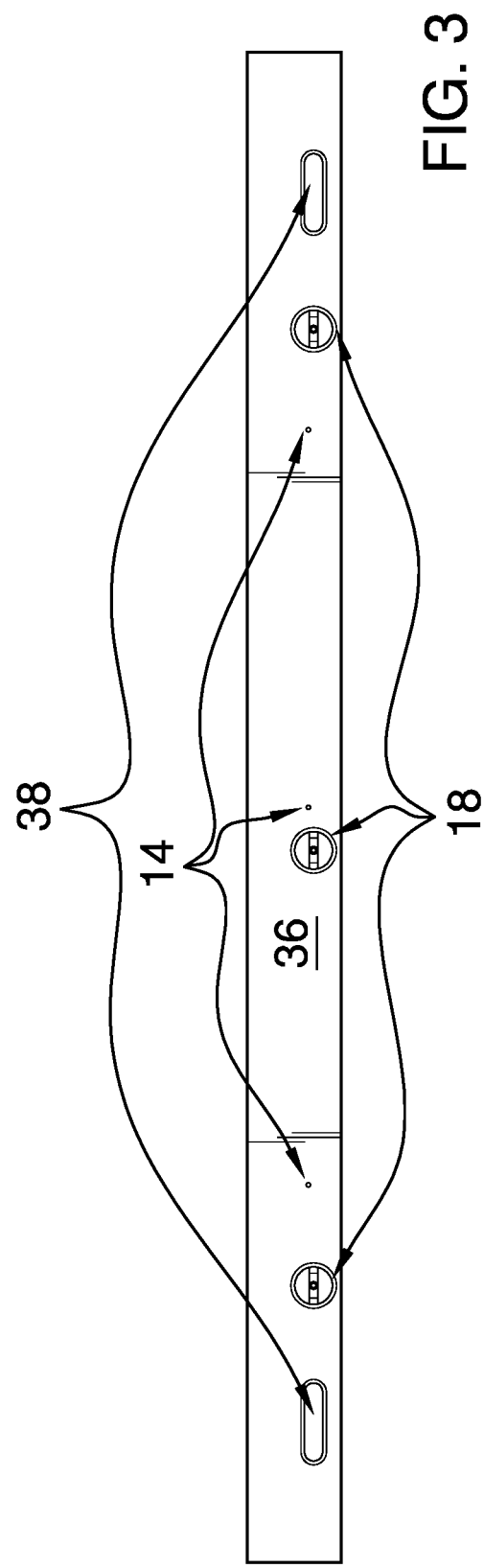

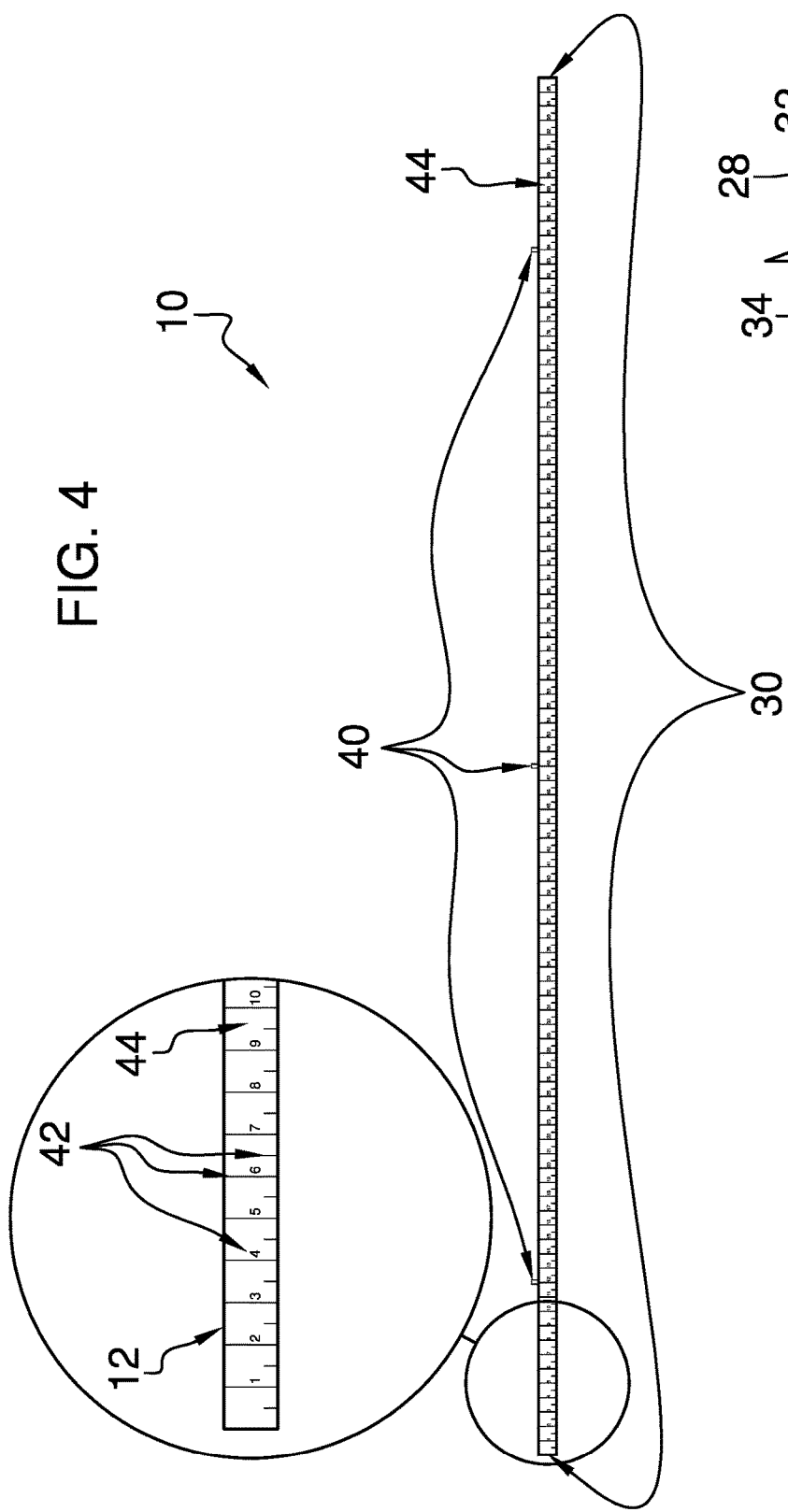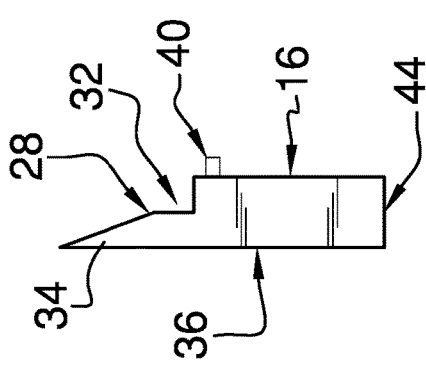

PANEL INSTALLATION ASSIST DEVICE

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION

(1) Field of the Invention

The disclosure relates to assist devices and more particularly pertains to a new assist device for supporting one end of a panel during installation.

(2) Description of Related Art Including Information Disclosed Under 37 CFR 1.97 and 1.98

The prior art relates to assist devices for panel installation, which may comprise lifts, brackets, shelves, and clamps.

BRIEF SUMMARY OF THE INVENTION

An embodiment of the disclosure meets the needs presented above by generally comprising a bar, which has a set of holes extending therethrough from a first face thereof. Respective holes are selectively alignable with studs of a wall or rafters of a ceiling. The holes are configured for selective insertion of mounting hardware to mount the bar to the studs or the rafter. The bar has a set of orifices positioned therethrough. Each of a set of spirit bubble tubes is engaged to the bar and positioned in a respective orifice. Respective spirit bubble tubes are configured to indicate an orientation of a longitudinal axis of the bar relative to horizontal and vertical. A notch extends into the bar from a first edge thereof and the first face, and between opposed ends of the bar. The notch is configured for insertion of an edge of a panel so that one end of the panel is supported by the bar by the bar to facilitate installation of the panel.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein:

FIG. 2 is a front view of an embodiment of the disclosure.

FIG. 3 is a rear view of an embodiment of the disclosure.

FIG. 4 is a bottom view of an embodiment of the disclosure.

FIG. 5 is an end view of an embodiment of the disclosure.

DETAILED DESCRIPTION OF THE INVENTION

Figure 1:
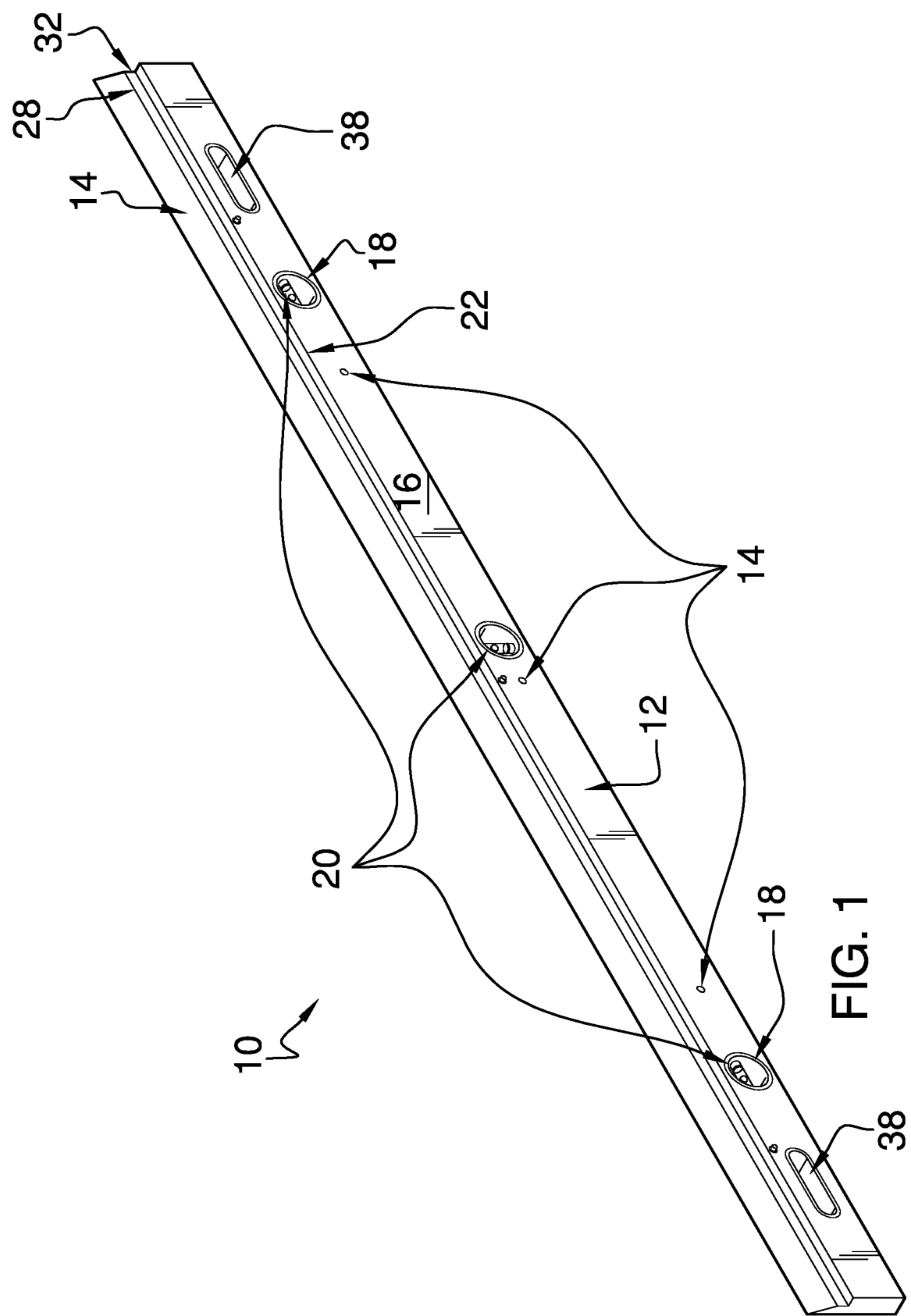
FIG. 1 is an isometric perspective view of a panel installation assist device according to an embodiment of the disclosure.

With reference now to the drawings, and in particular to FIGS. 1 through 5 thereof, a new assist device embodying the principles and concepts of an embodiment of the disclosure and generally designated by the reference numeral 10 will be described.

As best illustrated in FIGS. 1 through 5, the panel installation assist device 10 generally comprises a bar 12, which has a set of holes 14 extending therethrough from a first face 16 thereof. Respective holes 14 are selectively alignable with studs of a wall or rafters of a ceiling. The holes 14 are configured for selective insertion of mounting hardware (not shown, but including screws, nails, and the like) to mount the bar 12 to the studs or the rafters. Spacing between the holes 14 allows for their alignment with studs spaced at sixteen inches and rafters spaced at twenty four inches.

The bar 12 has a set of orifices 18 positioned therethrough. Each of a set of spirit bubble tubes 20 is engaged to the bar 12 and positioned in a respective orifice 18. Respective spirit bubble tubes 20 are configured to indicate an orientation of a longitudinal axis 22 of the bar 12 relative to horizontal and vertical. The spirit bubble tubes 20 allow the bar 12 to be leveled prior to mounting.

The set of spirit bubble tubes 20 comprises a first bubble tube 24 and two second bubble tubes 26. The first bubble tube 24 is centrally positioned in the bar 12 and oriented perpendicularly to a first edge 28 thereof. The first bubble tube 24 is configured to indicate a displacement of the longitudinal axis 22 from vertical. Each second bubble tube 26 is positioned between the first bubble tube 24 and a respective opposed end 30 of the bar 12 and in parallel to the longitudinal axis 22. The second bubble tube 26 is configured to indicate a displacement of the longitudinal axis 22 from horizontal.

A notch 32 extends into the bar 12 from the first edge 28 and the first face 16, and between the opposed ends 30 of the bar 12. The notch 32 is configured for insertion of an edge of a panel, such as plywood, drywall, sheet metal, glass, and the like, so that one end of the panel is supported by the bar 12 to facilitate installation of the panel.

A wedge 34 is engaged to and extends from the first edge 28 of the bar 12. The wedge 34 is positioned adjacent to a second face 36 of the bar 12 and extends between the opposed ends 30. The wedge 34 is configured to support the edge of the panel during its insertion into the notch 32 and to enable drawing of a straight line.

The bar 12 has a pair of cutouts 38 positioned therethrough, each of which is configured for insertion of digits of a respective hand of a user, enabling the user to grasp the bar 12. A set of pegs 40 is engaged to and extends from the first face 16 proximate to the notch 32. The pegs 40 are configured to facilitate alignment of the panel with the bar 12 and the studs or the rafters.

Indicia 42 positioned on a second edge 44 of the bar 12 are spaced at defined intervals between the opposed ends 30 of the bar 12. The indicia 42 are configured to enable measurement of a distance between two points.

In use, the bar 12 is mounted to the rafters with the first face 16 in abutment to the rafters, typically with drywall screws inserted into the bar 12 from the second face 36. The edge of the panel then is inserted into the notch 32 to support one end of the panel. The user then can lift panel and position it in abutment to the rafters for installation. For installing panels to the studs of a wall, the bar 12 can be mounted horizontally to the studs with the first face 16 in abutment to the studs and the notch 32 facing upwardly. The panel then can be inserted into the notch 32, where it will be supported by the bar 12 during installation.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the elements is present, unless the context clearly requires that there be only one of the elements.

I claim:

1. A panel installation assist device comprising:
a bar, the bar having a set of holes extending therethrough from a first face thereof, such that respective holes are selectively alignable with studs of a wall or rafters of a ceiling, wherein the holes are configured for selective insertion of mounting hardware for mounting the bar to the studs or the rafters such that the first face of the bar is positioned abutting the studs or the rafters, the bar having a set of orifices positioned therethrough;
a set of spirit bubble tubes, each spirit bubble tube being engaged to the bar and positioned in a respective orifice, wherein respective spirit bubble tubes are configured for indicating an orientation of a longitudinal axis of the bar relative to horizontal and vertical;
a notch extending into the bar from a first edge thereof and the first face, the notch extending between opposed ends of the bar, wherein the notch is configured for insertion of an edge of a panel such that one end of the panel is supported by the bar for facilitating installation thereof; and
a wedge engaged to and extending from the first edge of the bar, the wedge being positioned having a planar face coplanar with a second face of the bar and an angled face facing away from the second face of the bar wherein the wedge is configured to have the angled face facing the studs or the rafters, the wedge extending between the opposed ends of the bar, wherein the wedge is configured for facilitating insertion of the edge of the panel between the wedge and the studs or the rafters and into the notch.

2. The panel installation assist device of claim 1, further including the bar having a pair of cutouts positioned therethrough, wherein each cutout is configured for insertion of digits of a respective hand of a user, enabling the user to grasp the bar.

3. The panel installation assist device of claim 1, wherein the set of spirit bubble tubes comprises a first bubble tube and two second bubble tubes, the first bubble tube being centrally positioned in the bar and oriented perpendicularly to the first edge, each second bubble tube being positioned between the first bubble tube and a respective opposed end of the bar and in parallel to the longitudinal axis.

4. The panel installation assist device of claim 1, further including a set of pegs engaged to and extending from the first face proximate to the notch, wherein the pegs are configured for facilitating alignment of the panel with the bar and the studs or the rafters.

5. The panel installation assist device of claim 1, further including indicia positioned on a second edge of the bar, the indicia being spaced at defined intervals between the opposed ends of the bar, wherein the indicia are configured for enabling measurement of a distance between two points.

6. A panel installation assist device comprising:
a bar, the bar having a set of holes extending therethrough from a first face thereof, such that respective holes are selectively alignable with studs of a wall or rafters of a ceiling, wherein the holes are configured for selective insertion of mounting hardware for mounting the bar to the studs or the rafters such that the first face of the bar is positioned abutting the studs or the rafters, the bar having a set of orifices positioned therethrough, the bar having a pair of cutouts positioned therethrough, wherein each cutout is configured for insertion of digits of a respective hand of a user, enabling the user to grasp the bar;
a set of spirit bubble tubes, each spirit bubble tube being engaged to the bar and positioned in a respective orifice, wherein respective spirit bubble tubes are configured for indicating an orientation of a longitudinal axis of the bar relative to horizontal and vertical, the set of spirit bubble tubes comprising a first bubble tube and two second bubble tubes, the first bubble tube being centrally positioned in the bar and oriented perpendicularly to a first edge thereof, each second bubble tube being positioned between the first bubble tube and a respective opposed end of the bar and in parallel to the longitudinal axis;
a notch extending into the bar from the first edge and the first face, the notch extending between the opposed ends of the bar, wherein the notch is configured for insertion of an edge of a panel such that one end of the panel is supported by the bar for facilitating installation thereof;
a wedge engaged to and extending from the first edge of the bar, the wedge being positioned having a planar face coplanar with a second face of the bar and an angled face facing away from the second face of the bar wherein the wedge is configured to have the angled face facing the studs or the rafters, the wedge extending between the opposed ends of the bar, wherein the wedge is configured for facilitating insertion of the edge of the panel between the wedge and the studs or the rafters and into the notch;
a set of pegs engaged to and extending from the first face proximate to the notch, wherein the pegs are configured for facilitating alignment of the panel with the bar and the studs or the rafters; and
indicia positioned on a second edge of the bar, the indicia being spaced at defined intervals between the opposed ends of the bar, wherein the indicia are configured for enabling measurement of a distance between two points.

* * * * *